United States Patent
Petersen et al.

(10) Patent No.: US 12,079,895 B2
(45) Date of Patent: Sep. 3, 2024

(54) SYSTEMS AND METHODS FOR DISAGGREGATED ACCELERATION OF ARTIFICIAL INTELLIGENCE OPERATIONS

(71) Applicant: Meta Platforms, Inc., Menlo Park, CA (US)

(72) Inventors: Christian Markus Petersen, Golden, CO (US); Narsing Krishna Vijayrao, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 157 days.

(21) Appl. No.: 17/529,080

(22) Filed: Nov. 17, 2021

(65) Prior Publication Data

US 2023/0153938 A1     May 18, 2023

(51) Int. Cl.
*G06T 1/20*          (2006.01)
*G06F 18/214*       (2023.01)
*G06F 18/2431*     (2023.01)

(52) U.S. Cl.
CPC .............. *G06T 1/20* (2013.01); *G06F 18/214* (2023.01); *G06F 18/2431* (2023.01)

(58) Field of Classification Search
CPC ....... G06T 1/20; G06F 9/5044; G06F 18/214; G06F 18/2431; G06F 2209/509; G06N 3/044; G06N 3/0455; G06N 3/0464; G06N 3/048; G06N 3/0495; G06N 3/063; G06N 3/098
USPC ......................................................... 345/503
See application file for complete search history.

(56) References Cited

U.S. PATENT DOCUMENTS

| | | |
|---|---|---|
| 10,691,996 B2 | 6/2020 | Han et al. |
| 10,896,045 B2 | 1/2021 | Sodani et al. |
| 11,055,063 B2 | 7/2021 | Goyal et al. |
| 2018/0189234 A1* | 7/2018 | Nurvitadhi ............. G06F 17/16 |
| 2019/0205746 A1 | 7/2019 | Nurvitadhi et al. |

(Continued)

OTHER PUBLICATIONS

Hwang R., et al., "Centaur: A Chiplet-Based, Hybrid Sparse-Dense Accelerator for Personalized Recommendations," Retrieved from Internet: https://arxiv.org/pdf/2005.05968, May 12, 2020, 14 pages.

(Continued)

*Primary Examiner* — Jacinta M Crawford
(74) *Attorney, Agent, or Firm* — Greenberg Traurig, LLP

(57) ABSTRACT

A disclosed system may include a disaggregated artificial intelligence (AI) operation accelerator including a dense AI operation accelerator configured to accelerate dense AI operations and a sparse AI operation accelerator, physically separate from the dense AI operation accelerator, configured to accelerate sparse AI operations. The system may also include a scheduler that includes (1) a receiving module that receives an AI operation, (2) an identifying module that identifies the AI operation as a dense AI operation or sparse AI operation, and (3) a directing module that directs (a) the dense AI operation accelerator to accelerate identified dense AI operations, and (b) the sparse AI operation accelerator to accelerate identified sparse AI operations. The system may also include a physical processor that executes the receiving module, the identifying module, and the directing module. Various other methods, systems, and computer-readable media are also disclosed.

20 Claims, 7 Drawing Sheets

(56) References Cited

U.S. PATENT DOCUMENTS

2021/0191733 A1      6/2021  Gunnam et al.
2021/0240797 A1      8/2021  Rashid et al.
2021/0303909 A1*     9/2021  Gunnam ................ G06V 10/82

OTHER PUBLICATIONS

International Search Report and Written Opinion for International Application No. PCT/US2022/049935, mailed Mar. 3, 2023, 14 pages.
Kim S., et al., "Parallax: Automatic Data-Parallel Training of Deep Neural Networks," XP080902501, Aug. 8, 2018, 15 pages.
International Preliminary Report on Patentability for International Application No. PCT/US2022/049935, mailed May 30, 2024, 13 pages.

* cited by examiner

SYSTEMS AND METHODS FOR DISAGGREGATED ACCELERATION OF ARTIFICIAL INTELLIGENCE OPERATIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
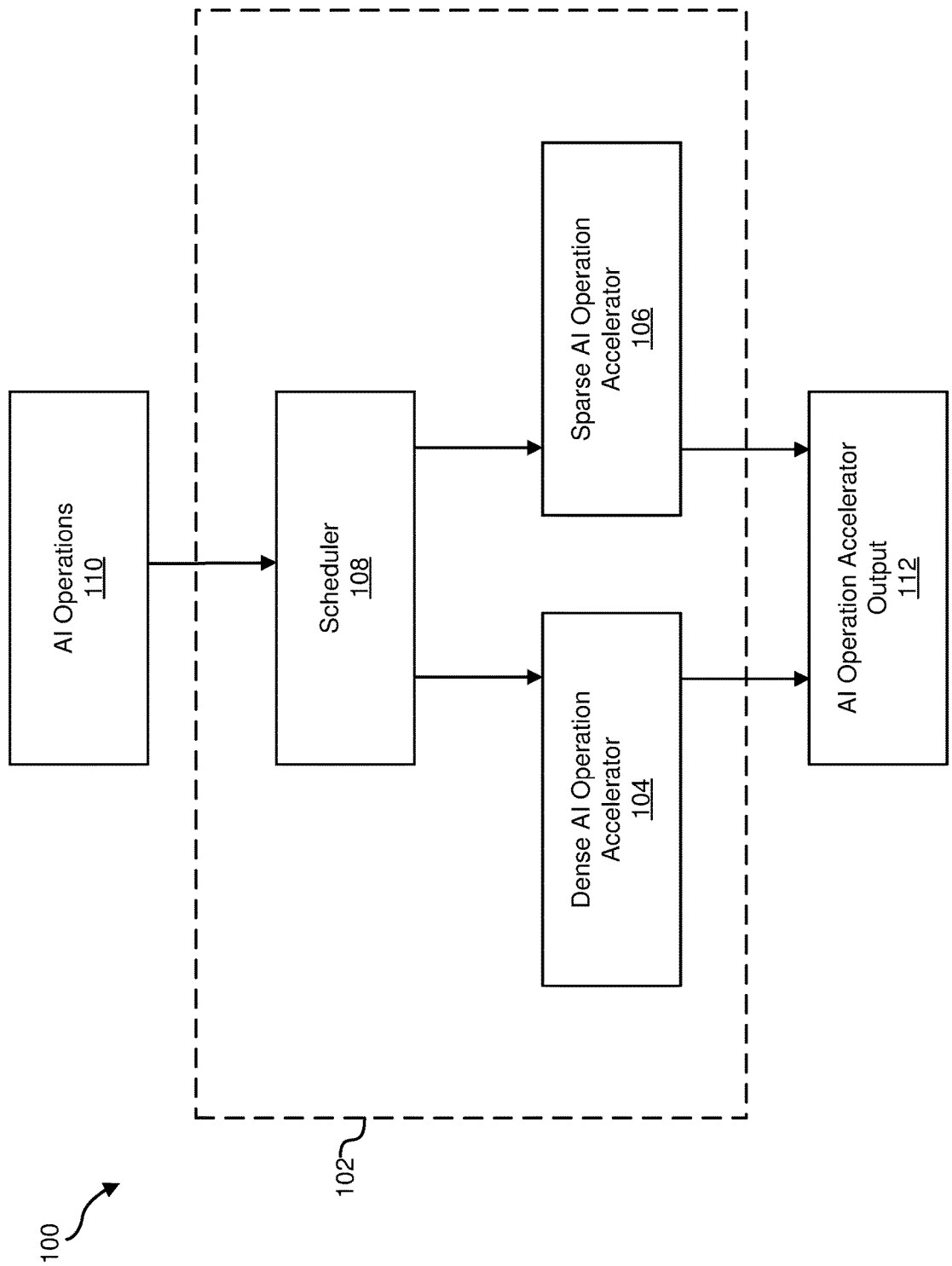
FIG. 1 is a block diagram of an example system that includes a disaggregated artificial intelligence (AI) operation accelerator in accordance with some embodiments described herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

AI models may provide increasingly important and accurate ways of making predictions based on given input data. Unfortunately, AI operations (e.g., training of AI models, making predictions using trained AI models, etc.) may be highly demanding and may require significant investments in physical computing infrastructure and/or electrical resources. In some conventional examples, hardware central processing units (CPUs) and/or hardware graphics processing units (GPUs) may be employed in devices and/or accelerators to accomplish various AI processes. Such conventional AI accelerators may incorporate various resources to perform an AI function (e.g., a training function, a prediction function, etc.) such as caches, specialized processors, complex networking hardware, and so forth. Unfortunately, such conventional devices may be inefficiently configured to perform different AI operations, and conventional AI operations may inefficiently utilize resources of such conventional accelerators.

At a high level, AI operations may be logically divided into sparse operations and dense operations. Sparse operations may refer to AI operations performed on sparse data, which may include data that includes a relatively low number of non-zero elements. Likewise, dense operations may refer to AI operations performed on dense data, which may include data that includes a relatively high number of non-zero elements. While the terms "sparse" and "dense" may be relatively loosely defined, a data element (e.g., a vector) may be referred to as k-sparse if it contains at most k non-zero entities. Put another way, a vector's $l_0$ norm may be k.

In the context of neural networks and/or AI models, activations of units within a particular layer of an artificial neural network (ANN), weights of nodes within the ANN, and/or data within the ANN may be referred to as "sparse" or "dense". Additionally or alternatively, connectivity within portions of an ANN may be referred to as "sparse" or "dense". For example, a layer within an ANN may be referred to as having "sparse connectivity" in that only a small subset of elements within the layer may be connected to each other, whereas a layer may be referred to as having "dense connectivity" in that a relatively large subset of elements within the layer may be connected to each other.

Forcing both sparse and dense AI operations into a single conventional AI accelerator may prevent efficient use of resources included in the conventional AI accelerator. Such conventional, all-purpose AI accelerators may also have complex and/or complicated designs, and hence may be difficult to implement, reproduce, and/or scale. Moreover, such conventional AI accelerators may have disadvantageous power usage characteristics, which may further result in a need for specialized cooling infrastructure. Hence, the systems and methods described herein identify and address a need for improved AI accelerators, systems, and/or methods.

The present disclosure is generally directed to systems and methods for disaggregated acceleration of artificial intelligence operations. As will be explained in greater detail below, embodiments of the instant disclosure may include a disaggregated AI operation accelerator. The disaggregated AI operation accelerator may include a dense AI operation accelerator (also "dense AI accelerator" herein) configured to accelerate dense AI training operations. The disaggregated AI operation accelerator may also include a sparse AI operation accelerator (also "sparse AI accelerator" herein), physically separate from the dense AI accelerator, and configured to accelerate sparse AI training operations. Embodiments may also include a scheduler that may include various modules that may perform and/or direct various operations involving the disaggregated AI operation accelerator. For example, the scheduler may include a receiving module that may receive an AI operation and an identifying module that may identify the AI operation as a dense AI operation and/or a sparse AI operation. The scheduler may also include a directing module that may direct the dense AI accelerator to accelerate the AI operation when the identifying module identifies the AI operation as a dense training operation and/or may direct the sparse AI accelerator to accelerate the AI operation when the identifying module identifies the AI operation as a sparse AI operation. In some embodiments, the scheduler may be implemented as part of a system (e.g., a computing device) that includes at least one physical processor that may execute the receiving module, the identifying module, and the directing module.

Embodiments of the systems and methods described herein may therefore effectively disaggregate AI operations into separate sparse and dense portions, thus enabling development of an accelerator design that is specifically built for each type of operation and/or function. In this new approach, the sparse AI accelerator and the dense AI accelerator may scale independently of each other as needed by a particular AI operation, task, and/or model. For example, an embodiment may have more sparse resources made available when an AI operation (e.g., training of an AI model, predicting an output from input data via a trained AI model, etc.) requires more sparse resources than dense resources. Likewise, an additional or alternative embodiment may have more dense resources made available when an additional AI operation requires more dense resources than sparse resources. As an illustration, multiple sparse AI accelerators could be connected to and/or included in a system that includes only one dense AI accelerator, or vice versa. This flexibility makes the systems and methods described herein highly scalable, especially in comparison to conventional or traditional approaches. Furthermore, the high flexibility of the systems and methods described herein may make such embodiments able to accelerate AI operations involving not only existing AI models, but future AI models as well.

The following will provide, with reference to FIGS. 1-6, detailed descriptions of systems for disaggregated acceleration of artificial intelligence operations. Detailed descriptions of corresponding computer-implemented methods will also be provided in connection with FIG. 7.

FIG. 1 is a block diagram of an example system 100 that includes a disaggregated AI operation accelerator in accordance with some embodiments described herein. As shown, example system 100 includes a disaggregated AI operation accelerator 102 that includes a dense AI accelerator 104, a sparse AI accelerator 106, and a scheduler 108. As will be described in greater detail below, one or more components of disaggregated AI operation accelerator 102 (e.g., scheduler 108) may receive one or more AI operations 110. Likewise, one or more components of disaggregated AI operation accelerator 102 (e.g., dense AI accelerator 104 and/or sparse AI accelerator 106) may process one or more AI operations 110 as directed by scheduler 108 to produce an AI accelerator output 112.

In some examples, dense AI accelerator 104 may include any suitable hardware and/or software components that may enable dense AI accelerator 104 to accelerate one or more dense AI operations. For example, dense AI accelerator 104 may include one or more matrix multiplication units, wide vector units, and/or tensor units that may be configured to operate efficiently on dense data (e.g., data having a relatively high number of non-zero values) and/or to efficiently execute operations that generally may apply to and/or use dense data (e.g., compute and/or tensor operations). Hence, dense AI accelerator 104 may be primarily (though not necessarily exclusively) focused on compute and/or tensor operations involving an AI model (e.g., training the AI model, predicting a result from input data via the AI model, etc.).

In some embodiments, sparse AI accelerator 106 may include any suitable hardware and/or software components that may enable sparse AI accelerator 106 to accelerate one or more sparse AI operations. For example, sparse AI accelerator 106 may include memory, such as high-bandwidth memory (also "HBM" herein) and/or other forms of memory that may be configured to store and/or operate on sparse data (e.g., data having a relatively low number of non-zero values) and or to efficiently execute operations that generally may apply to and/or use sparse data (e.g., element wise operations). Sparse AI accelerator 106 may also include one or more vector units that may enable element-wise operations including, but not limited to, rectified linear unit (ReLU) operations, sigmoid operations, hyperbolic tangent (tanh) functions, and so forth. Hence, sparse AI accelerator 106 may be primarily (though not necessarily exclusively) focused on memory embedding and/or other memory operations (e.g., memory management, sparse data processing, etc.) involving an AI model.

As shown in FIG. 1, in some examples, one or more elements of disaggregated AI operation accelerator 102 (e.g., scheduler 108) may receive AI operations 110 In some examples, AI operations 110 may be referred to as "AI operations" in that they may serve as input to one or more elements of disaggregated AI operation accelerator 102. In some examples, AI operations (e.g., AI operations 110) may include any suitable data set including, but not limited to, one or more trained AI models, one or more AI model training parameters, AI model training data, feature inputs to be run through a trained AI model, and so forth.

Figure 2:
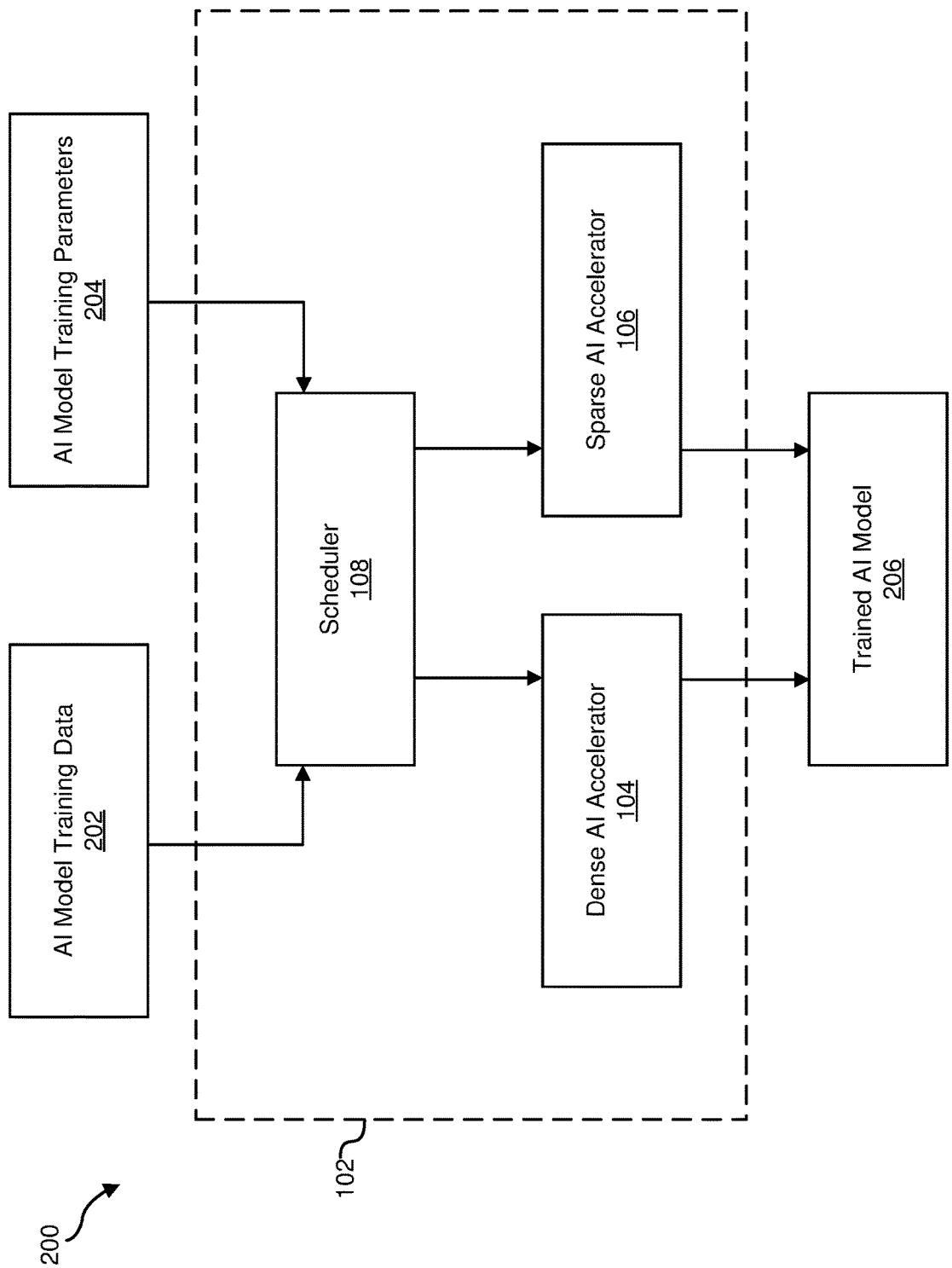
FIG. 2 is a block diagram of an example system that includes a disaggregated AI operation accelerator in accordance with some embodiments described herein.

FIG. 2 is a block diagram of an example system 200 that includes a disaggregated AI operation accelerator in accordance with some embodiments described herein. Example system 200 may illustrate an example embodiment of a system that may be configured to use a disaggregated AI operation accelerator (e.g., disaggregated AI operation accelerator 102) to train an AI model. As shown, example system 200 includes a disaggregated AI operation accelerator 102 that includes a dense AI accelerator 104, a sparse AI accelerator 106, and a scheduler 108. As will be described in greater detail below, one or more components of disaggregated AI operation accelerator 102 (e.g., scheduler 108) may receive AI operations in a form of AI model training data 202 and/or AI model training parameters 204. Likewise, one or more components of disaggregated AI operation accelerator 102 (e.g., dense AI accelerator 104 and/or sparse AI accelerator 106) may process AI model training data 202 and/or AI model training parameters 204 as directed by scheduler 108 to produce a trained AI model 206.

As shown in FIG. 2, in some examples, one or more elements of disaggregated AI operation accelerator 102 (e.g., scheduler 108) may receive AI operations in a form of AI model training data 202 and/or AI model training parameters 204. In some examples, AI model training data 202 and/or AI model training parameters 204 may be referred to as "AI model training operations" in that they may serve as input to one or more elements of disaggregated AI operation accelerator 102. In some examples, AI model training data (e.g., AI model training data 202) may include any data set input into a training algorithm and used to train an AI model, such as training data sets, validation data sets, and/or test data sets. Likewise, in some embodiments, an AI model training parameter (e.g., AI model training parameters 204) may include any value, setting, parameter, and so forth associated with an AI model that may be predetermined in advance of a training process.

In AI and/or machine learning contexts, a model may be defined and/or represented by model parameters. Training parameters may include parameters that may control the learning process. In some examples, training parameters may be referred to as "hyperparameters" in that they may influence and/or control the learning process and model parameters that may result therefrom. Training parameters may be determined (e.g., selected by a user, determined as a result of a selection process, etc.) in advance of training of the model. In some examples, training parameters and/or hyperparameters may be considered external to an AI model because, while used by a learning algorithm, they may not be included as part of a resulting trained model. Examples may include, without limitation, a train—test split ratio, a learning rate in optimization algorithm (e.g. gradient descent), a choice of optimization algorithm (e.g., gradient descent, stochastic gradient descent, Adam optimizer, etc.), a choice of an choice of activation function in a neural network layer (e.g. sigmoid, ReLU, tanh), a choice of cost or loss function, a number of hidden layers in a neural network, a number of activation units in each layer, a dropout probability, a number of iterations or epochs in training of a neural network, a number of clusters in a clustering task, a kernel or filter size in a convolutional layer, a pooling size, a batch size, and so forth.

Trained AI model 206 may include any model, program, tool, algorithm, process, and so forth, based on a predefined data set, that, when provided with input data, may arrive at an inference regarding the input data. In some examples, trained AI model 206 may include a program that has been trained on a predefined training data set (also called a "training set") to recognize patterns from input data that may differ from and/or are congruent with the training data set. In some examples, trained AI model 206 may include and/or represent a supervised, unsupervised, and/or reinforcement-based machine learning model. In some examples, trained AI model 206 may include or represent, without limitation, an ANN such as a deep learning model, autoencoder, a multilayer perceptron, a recurrent neural network, a convolutional neural network (CNN), and so forth. In some examples, trained AI model 206 may include a portion of (e.g., a layer of) another trained AI model.

Hence, in embodiments, such as the example illustrated in FIG. 2, scheduler 108, included in disaggregated AI operation accelerator 102, may receive AI operations in the form of AI model training data 202 and/or AI model training parameters 204. Scheduler 108 may identify each received AI operation as a dense AI operation and/or a sparse AI operation. Scheduler 108 may then direct dense AI accelerator 104 to execute AI operations identified as dense AI operations. Likewise, scheduler 108 may also direct sparse AI accelerator 106 to accelerate AI operations identified as sparse AI operations. Acceleration of AI model training data 202 and/or AI model training parameters 204 via disaggregated AI operation accelerator 102 may thus result in trained AI model 206.

Figure 3:
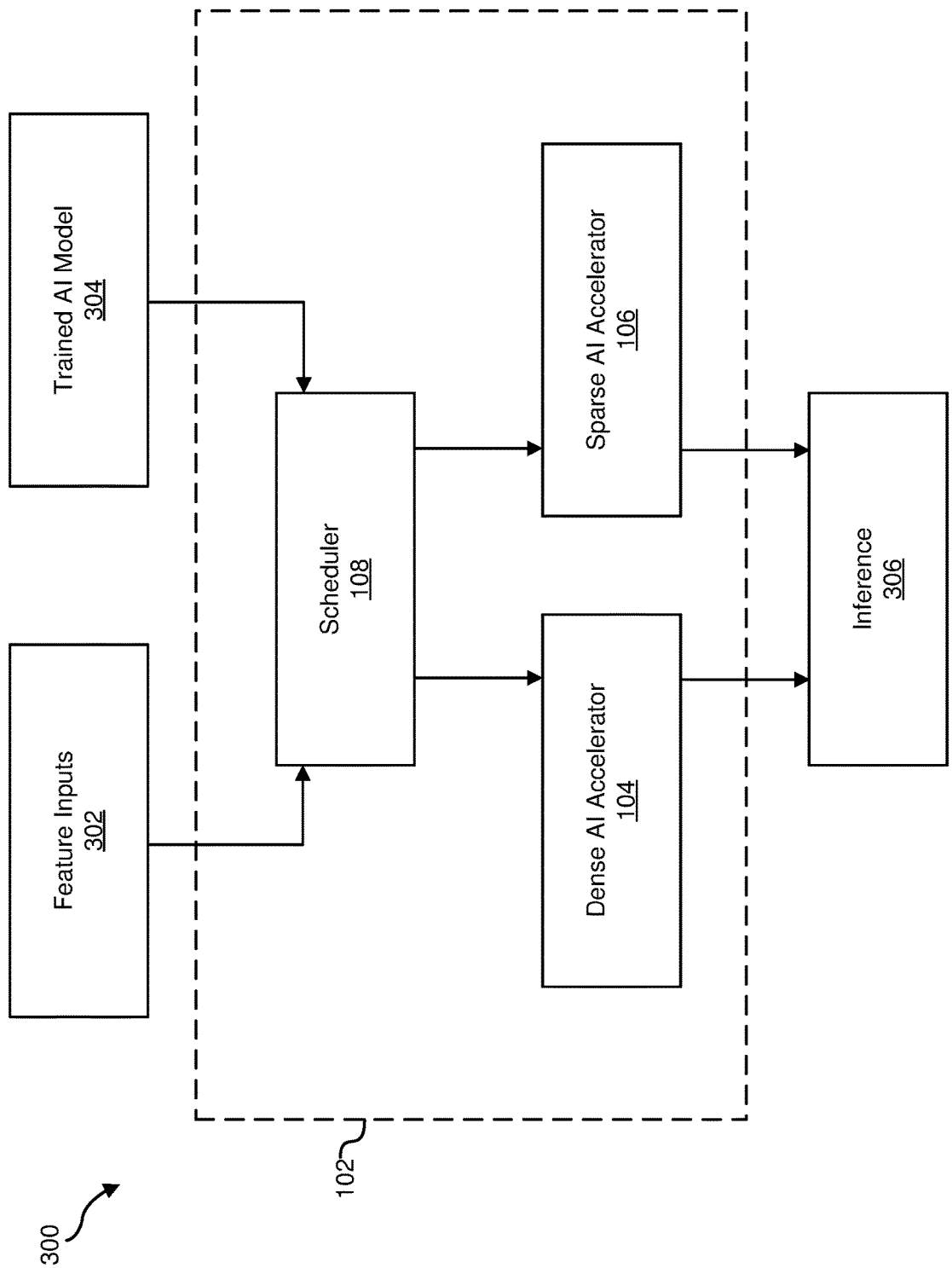
FIG. 3 is a block diagram of an example system that includes a disaggregated AI operation accelerator in accordance with some embodiments described herein.

FIG. 3 is a block diagram of an example system 300 that includes a disaggregated AI operation accelerator in accordance with some embodiments described herein. Example system 300 may illustrate an example embodiment of a system that may be configured to use a disaggregated AI operation accelerator (e.g., disaggregated AI operation accelerator 102) to make an inference (e.g., inference 306) regarding input data (e.g., feature inputs 302) via a trained AI model (e.g., trained AI model 304). As shown, example system 300 includes a disaggregated AI operation accelerator 102 that includes a dense AI accelerator 104, a sparse AI accelerator 106, and a scheduler 108. As will be described in greater detail below, one or more components of disaggregated AI operation accelerator 102 (e.g., scheduler 108) may receive AI operations in a form of feature inputs 302 and/or trained AI model 304. Likewise, one or more components of disaggregated AI operation accelerator 102 (e.g., dense AI accelerator 104 and/or sparse AI accelerator 106) may process feature inputs 302 and/or trained AI model 304 as directed by scheduler 108 to produce an inference 306.

As shown in FIG. 3, in some examples, one or more elements of disaggregated AI operation accelerator 102 (e.g., scheduler 108) may receive AI operations in a form of feature inputs 302 and/or trained AI model 304. In some examples, feature inputs 302 and/or trained AI model 304 may be referred to as "AI inference operations" in that they may serve as input to one or more elements of disaggregated AI operation accelerator 102. In some examples, feature inputs (e.g., feature inputs 302) may include any data set to be input into at least a portion of a trained AI model (e.g., trained AI model 304) to produce an inference regarding and/or associated with the feature inputs. Likewise, in some embodiments, a trained AI model (e.g., trained AI model 304) may include any AI model that has been previously trained to make inferences regarding one or more feature inputs.

Like trained AI model 206, trained model 304 may include any model, program, tool, algorithm, process, and so forth, based on a predefined data set, that, when provided with input data, may arrive at an inference regarding the input data. Also like trained AI model 206, in some examples, trained model 304 may include a program that has been trained on a predefined training data set (also called a "training set") to recognize patterns from input data that may differ from and/or are congruent with the training data set. In some examples, trained model 304 may include and/or represent a supervised, unsupervised, and/or reinforcement-based machine learning model. In some examples, trained model 304 may include or represent, without limitation, an ANN such as a deep learning model, autoencoder, a multilayer perceptron, a recurrent neural network, a CNN, and so forth. In some examples, trained model 304 may include a portion of (e.g., a layer of) another trained AI model.

Hence, in embodiments such as the example illustrated in FIG. 3, scheduler 108, included in disaggregated AI operation accelerator 102, may receive AI operations in the form of feature inputs 302 and/or trained AI model 304. Scheduler 108 may identify each received AI operation (e.g., each of feature inputs 302 and/or each portion of trained AI model 304) as a dense AI operation or a sparse AI operation. Scheduler 108 may then direct dense AI accelerator 104 to execute AI operations identified as dense AI operations. Likewise, scheduler 108 may also direct sparse AI accelerator 106 to accelerate AI operations identified as sparse AI operations. Acceleration of evaluation of feature inputs 302 using trained AI model 304 via disaggregated AI operation accelerator 102 may thus result in an inference 306. In some examples, inference 306 may include any suitable representation of an inference regarding and/or associated with feature inputs 302 such as, without limitation, a score, a probability, a threshold, a binary value, representations thereof, and so forth.

Figure 4:
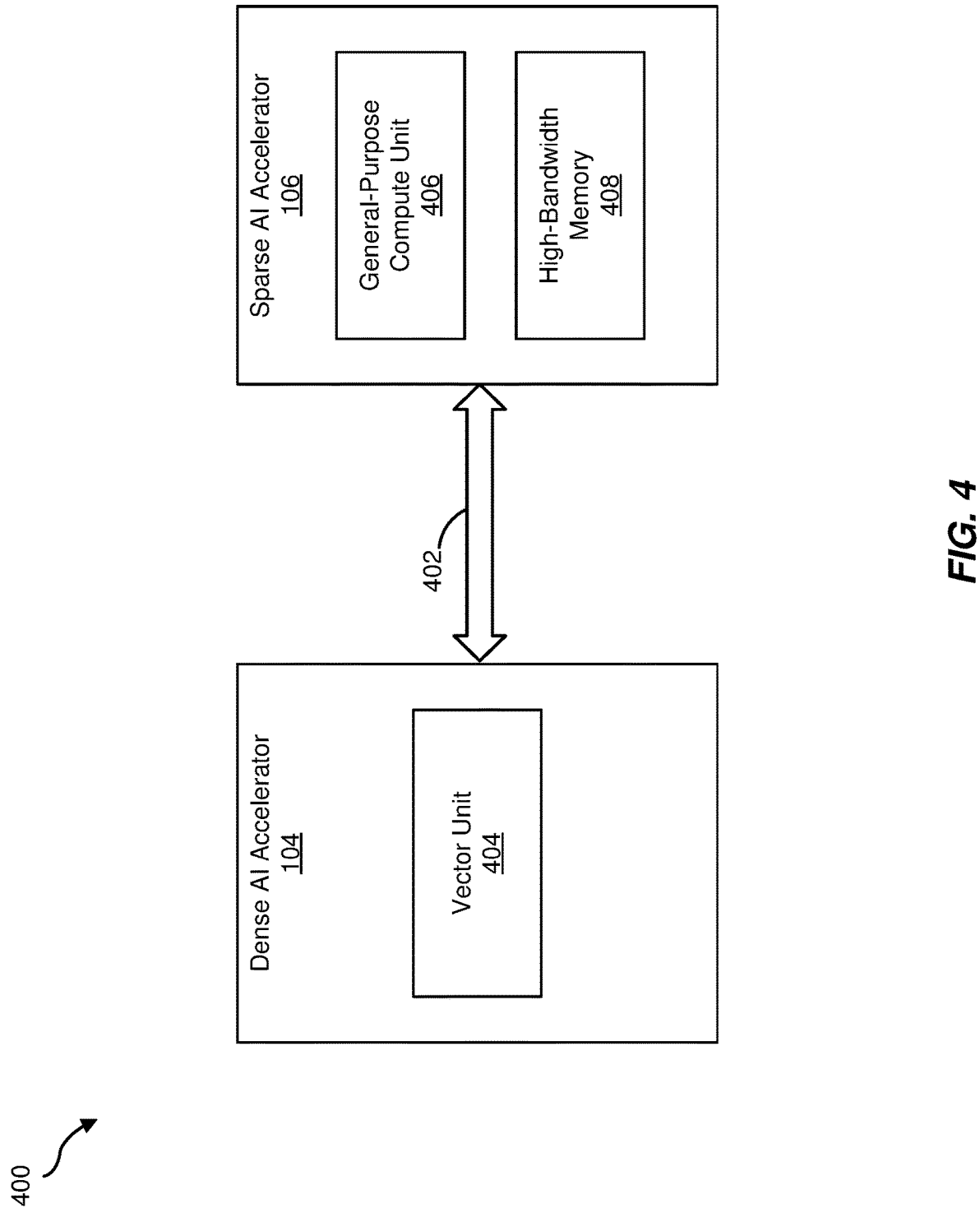
FIG. 4 is a block diagram of an example disaggregated AI operation accelerator in accordance with some embodiments described herein.

FIG. 4 is a block diagram of an example disaggregated AI operation accelerator 400 in accordance with some embodiments described herein. AI operation accelerator 400 may be an example and/or a detailed illustration of disaggregated AI operation accelerator 102. As shown, disaggregated AI operation accelerator 400 may include dense AI accelerator 104 and sparse AI accelerator 106.

As illustrated, in some embodiments, dense AI accelerator 104 may be separate and distinct from sparse AI accelerator 106. In some examples, dense AI accelerator 104 may be physically and/or logically separate from sparse AI accelerator 106. By way of illustration, in some examples, dense AI accelerator 104 may be included as part of a primary integrated circuit and sparse AI accelerator 106 may be included as part of a secondary integrated circuit. In additional examples, dense AI accelerator 104 may communicate with sparse AI accelerator 106 via a suitable high bandwidth bus. In the example illustrated in FIG. 4, dense AI accelerator 104 may be communicatively coupled to sparse AI accelerator 106 via high-bandwidth bus 402. High-bandwidth bus 402 may include any suitable bus or communication facility that may enable separate dense AI accelerator 104 and sparse AI accelerator 106 to communicate AI operations, AI data, and/or output data one with another. For example, and not by way of limitation, high-bandwidth bus 402 may include an internal bus such as an internal data bus, a memory bus, a front-side bus, and/or an external or expansion bus.

As mentioned above and as illustrated in FIG. 4, dense AI accelerator 104 may include a vector unit 404. In some examples, vector unit 404 may include any hardware or software processor that implements an instruction set designed to operate efficiently and effectively on single-dimension or multidimensional arrays of data called vectors. Vector units or vector processors may improve performance on certain workloads such as some machine learning tasks. Although not illustrated in FIG. 4, dense AI accelerator 104 may also include any suitable memory and/or storage device that may receive and/or store preliminary, initial, intermediary, and/or final data for one or more vector operations supported and/or executed by vector unit 404.

Sparse AI accelerator 106 may include a general-purpose compute unit 406 and a high-bandwidth memory 408. General-purpose compute unit 406 may include any suitable processor that may be configured to efficiently execute sparse AI operations in hardware. In some examples, general-purpose compute unit 406 may include and/or may implement an instruction set directed to executing sparse AI operations. As mentioned above, sparse AI operations may also include one or more wide vector units that may enable and/or execute element wise operations like ReLU, sigmoid, tanh, and similar operations. As shown, sparse AI accelerator 106 may also include a high-bandwidth memory 408. High-bandwidth memory 408 may include or represent any suitable memory and/or storage device that may receive and/or store preliminary, initial, intermediary, and/or final data for one or more sparse AI operations supported by and/or executed by general-purpose compute unit 406.

Figure 5:
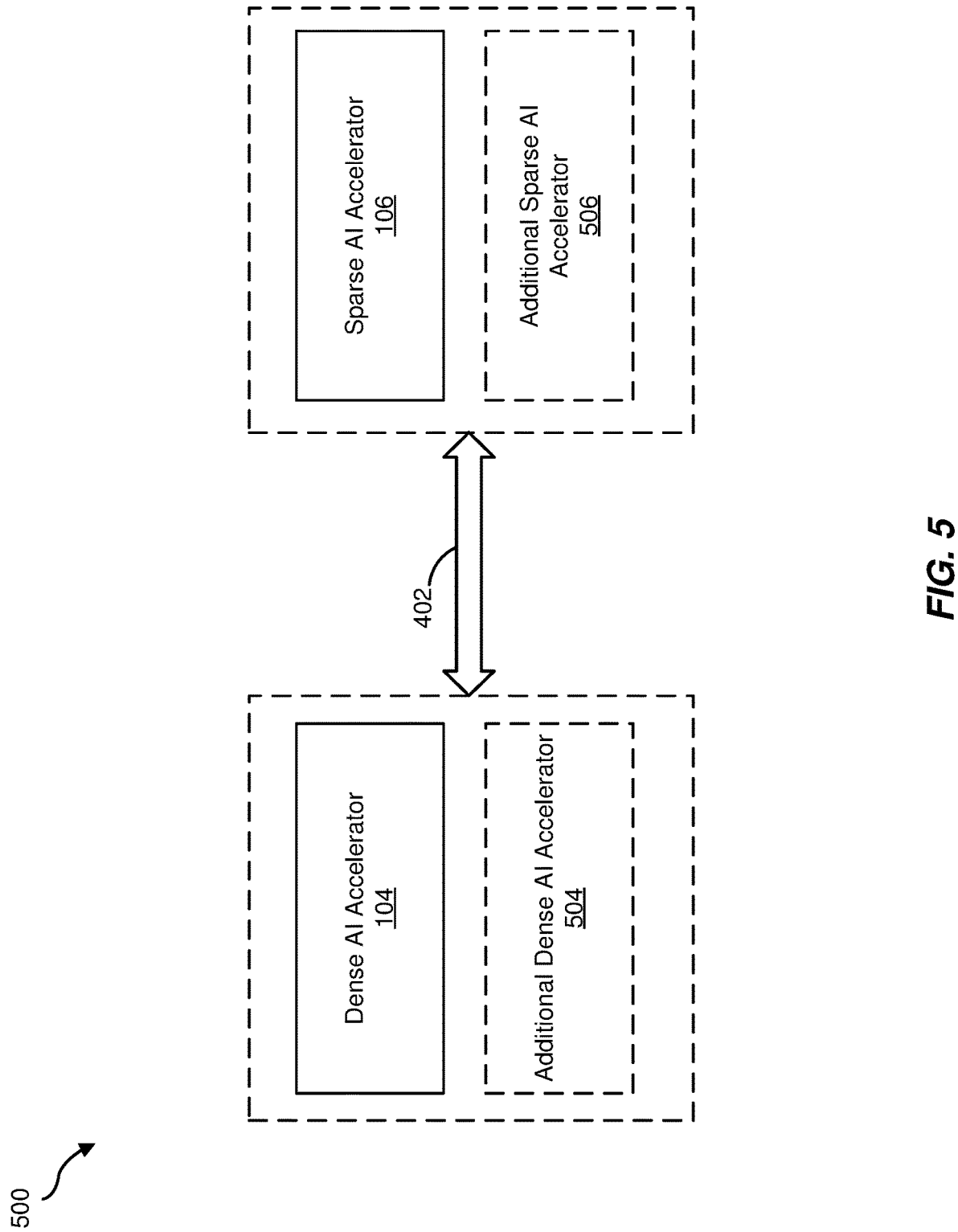
FIG. 5 is a block diagram of an example disaggregated AI operation accelerator having a plurality of dense accelerators and/or a plurality of sparse accelerators in accordance with some embodiments described herein.

It may be clear that the design of disaggregated AI operation accelerator 102 may be highly modular and may support addition of any suitable number of dense AI accelerators and/or sparse AI accelerators to efficiently accelerate a desired AI operation or process. For example, FIG. 5 shows a block diagram of an example disaggregated AI operation accelerator 500 having a plurality of dense accelerators and/or a plurality of sparse accelerators. As shown in this example, dense AI accelerator 104 may be paired with at least one additional dense AI accelerator 504. Likewise, sparse AI accelerator 106 may be paired with at least one additional sparse AI accelerator 506. The dense AI accelerator(s) (e.g., dense AI accelerator 104 and/or additional dense AI accelerator 504) may be communicatively coupled to the sparse AI accelerator(s) (e.g., sparse AI accelerator 106 and/or additional sparse accelerator 506) via high-bandwidth bus 402. In this way, the design of disaggregated AI operation accelerator 500 may allow sparse and dense functions of disaggregated AI operation accelerator 500 to scale independently of each other as dictated by, required by, and/or may be beneficial to the efficient training and/or use of an AI model by disaggregated AI operation accelerator 500.

An important feature of the systems and methods described herein may be a scheduler (e.g., scheduler 108) that effectively and efficiently orchestrates operations of the disaggregated AI operation accelerator. At a high level, such a scheduler (e.g., scheduler 108) may distinguish dense AI operations from sparse AI operations. The scheduler may also direct a suitable dense AI accelerator (e.g., dense AI accelerator 104, additional dense AI accelerator 504, etc.) to accelerate the dense AI operations and/or may direct a suitable sparse AI accelerator (e.g., sparse AI accelerator 106, additional sparse AI accelerator 506, etc.) to accelerate the sparse AI operations. The scheduler may further collect results of the accelerated AI operations. As shown in FIG. 1, scheduler 108 may include any suitable hardware and/or software system that receives AI operations, identifies dense AI operations and/or sparse AI operations, and directs dense AI accelerator 104 and/or sparse AI accelerator 106 to execute respective dense AI operations and/or sparse AI operations. In some examples, scheduler 108 may also collect results of various AI operations executed by one or more components of the disaggregated AI operation accelerator.

Figure 6:
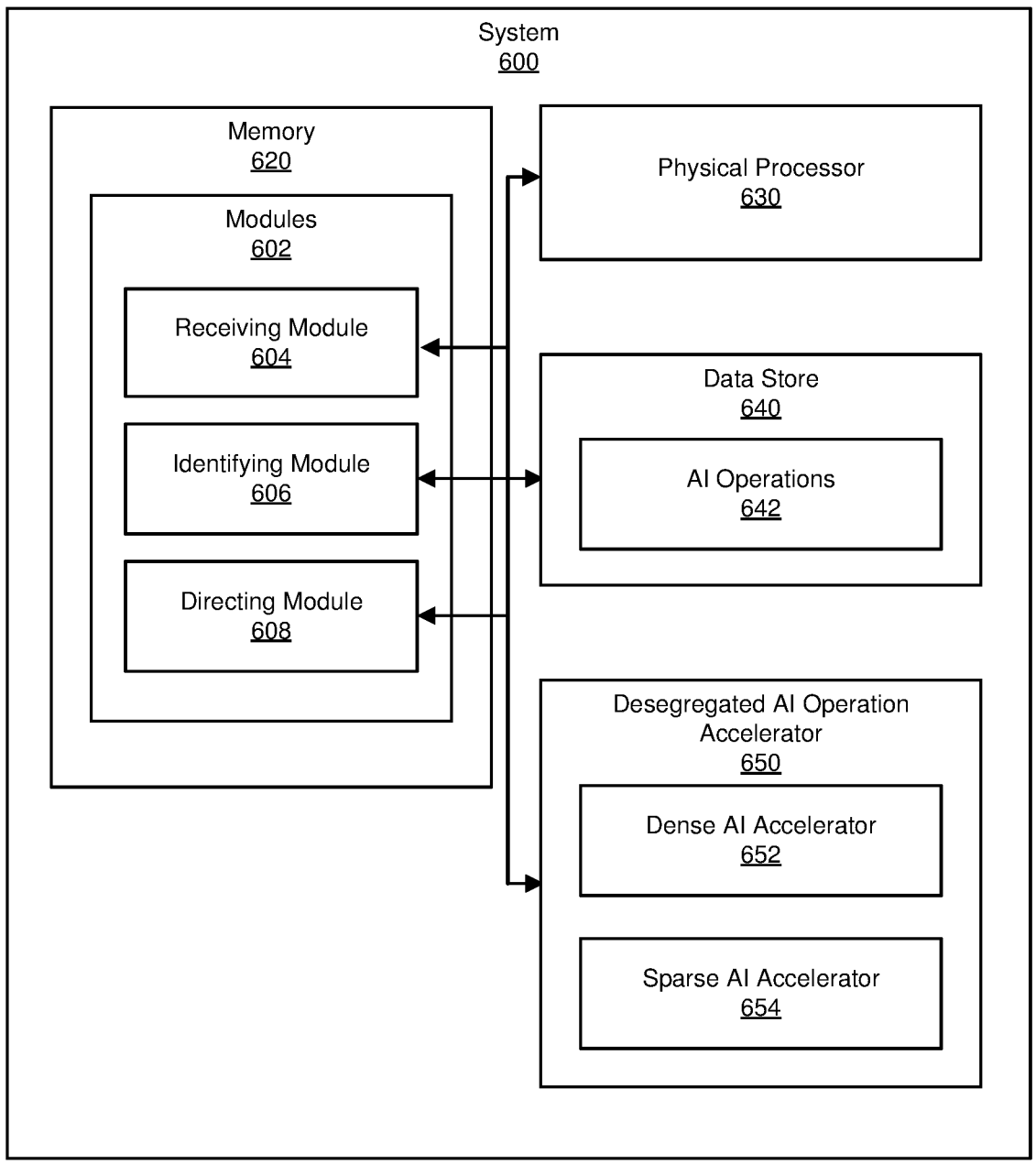
FIG. 6 is a block diagram of an example scheduler system for disaggregated acceleration of artificial intelligence operations as described herein.

FIG. 6 is a block diagram of an example scheduler system 600 for disaggregated acceleration of artificial intelligence operations as described herein. In some examples, example scheduler system 600 may be an example and/or implementation of scheduler 108. As illustrated in this figure, example scheduler system 600 may include one or more modules 602 for performing one or more tasks. Modules 602 may be included in a memory 620 in communication with a physical processor 630, a data store 640, and a disaggregated AI operation accelerator 650.

As will be explained in greater detail below, modules 602 may include a receiving module 604 that receives an AI operation (e.g., one of AI operations 642 included in data store 640) and an identifying module 606 that identifies the AI operation as a dense AI operation and/or a sparse AI operation. Example scheduler system 600 may also include a directing module 608 that directs a dense AI accelerator (e.g., dense AI accelerator 652 included in disaggregated AI operation accelerator 650) to accelerate the AI operation when identifying module 606 identifies the AI operation as a dense AI training operation, and that directs a sparse AI accelerator (e.g., sparse AI accelerator 654 included in disaggregated AI operation accelerator 650) to accelerate the AI operation when identifying module 606 identifies the AI operation as a sparse AI training operation.

As further illustrated in FIG. 6, example scheduler system 600 may also include one or more memory devices, such as memory 620. Memory 620 generally represents any type or form of volatile or non-volatile storage device or medium capable of storing data and/or computer-readable instructions. In one example, memory 620 may store, load, and/or maintain one or more of modules 602. Examples of memory 620 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 6, example scheduler system 600 may also include one or more physical processors, such as physical processor 630. Physical processor 630 generally represents any type or form of hardware-implemented processing unit capable of interpreting and/or executing computer-readable instructions. In one example, physical processor 630 may access and/or modify one or more of modules 602 stored in memory 620. Additionally or alternatively, physical processor 630 may execute one or more of modules 602 to facilitate disaggregated acceleration of artificial intelligence operations. Examples of physical processor 630 may include, without limitation, microprocessors, microcontrollers, central processing units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As also shown in FIG. 6, example scheduler system 600 may also include (e.g., be in communication with) one or more data stores, such as data store 640, that may receive, store, and/or maintain data. Data store 640 may represent portions of a single data store or computing device or a plurality of data stores or computing devices. In some embodiments, data store 640 may be a logical container for data and may be implemented in various forms (e.g., a database, a file, a file system, a data structure, etc.). Examples of data store 640 may include, without limitation, files, file systems, data stores, databases, and/or database management systems such as an operational data store (ODS), a relational database, a NoSQL database, a NewSQL database, and/or any other suitable organized collection of data.

In at least one example, data store 640 may include (e.g., store, host, access, maintain, etc.) AI operations 642. As explained above, in some examples, AI operations 642 may include any data that may serve as input to one or more elements of a disaggregated AI operation accelerator (e.g., disaggregated AI operation accelerator 102, disaggregated AI operation accelerator 650, etc.) such as AI model training data (e.g., AI model training data 202), AI model training parameters (e.g., AI model training parameters 204), feature inputs (e.g., feature inputs 302), trained AI models (e.g., trained AI model 304), and so forth.

As further shown in FIG. 6, example scheduler system 600 may include (e.g., may be in communication with) a disaggregated AI operation accelerator 650 that may include a dense AI accelerator 652 and a sparse AI accelerator 654. Disaggregated AI operation accelerator 650 may include and/or represent any of the disaggregated AI operation accelerators described herein (e.g., disaggregated AI operation accelerator 102, disaggregated AI operation accelerator 400, disaggregated AI operation accelerator 500, etc.).

Example scheduler system 600 in FIG. 6 may be implemented in any suitable way. For example, a computing device (e.g., a user device and/or server) having at least one processor may be programmed with one or more of modules 602. In at least one embodiment, one or more of modules 602 may, when executed by the computing device, enable the computing device to perform one or more operations to disaggregate AI model training operations. For example, receiving module 604 may cause the computing device to receive (e.g., from data store 640) an AI model training operation (e.g., one or more of AI model training operations 642). Furthermore, identifying module 606 may cause the computing device to identify the AI model training operation as a dense AI training operation or a sparse AI training operation. Moreover, directing module 608 may cause the computing device to direct the dense AI accelerator to accelerate the AI model training operation when identifying module 606 identifies the AI model training operation as a dense AI training operation. Directing module 608 may also cause the computing device to direct the sparse AI accelerator to direct the sparse AI accelerator to accelerate the AI model training operation when identifying module 606 identifies the AI model training operation as a sparse AI training operation.

Additionally, in some examples, a scheduler device as described herein (e.g., scheduler 108, example scheduler system 600, etc.) may, when a disaggregated AI operation accelerator includes multiple dense AI accelerators and/or sparse AI accelerators, determine which AI accelerator should execute an identified AI training operation and direct the selected AI accelerator to accelerate (e.g., execute using resources of the accelerator) the identified AI training operation. Hence, a scheduler device (e.g., scheduler 108, example scheduler system 600, etc.) may also perform a load balancing function among multiple dense and/or sparse AI accelerators included as part of a disaggregated AI operation accelerator (e.g., disaggregated AI operation accelerator 102, disaggregated AI operation accelerator 400, disaggregated AI operation accelerator 500, and so forth).

For example, as described above in reference to FIG. 5, a disaggregated AI operation accelerator may be configured with a dense AI accelerator and an additional dense AI accelerator. When identifying module 606 identifies an AI training operation as a dense AI training operation, one or more of modules 602 (e.g., identifying module 606, directing module 608, etc.) may select the dense AI accelerator or the additional AI accelerator (e.g., based on a workload currently being accelerated by the dense AI accelerators) to direct to execute the AI training operation. Directing module 608 may then direct the selected dense AI accelerator (e.g., the dense AI accelerator or the additional dense AI accelerator) to accelerate (e.g., execute using resources of the accelerator) the AI training operation.

Many other devices or subsystems may be connected to example scheduler system 600 in FIG. 6. Conversely, all of the components and devices illustrated in FIG. 6 need not be present to practice the embodiments described and/or illustrated herein. The devices and subsystems referenced above may also be interconnected in different ways from those shown in FIG. 6. Example scheduler system 600 may also employ any number of software, firmware, and/or hardware configurations. For example, one or more of the example embodiments of scheduler 108 and/or example scheduler system 600 disclosed herein may be encoded as a computer program (also referred to as computer software, software applications, computer-readable instructions, and/or computer control logic) on a computer-readable medium.

Figure 7:
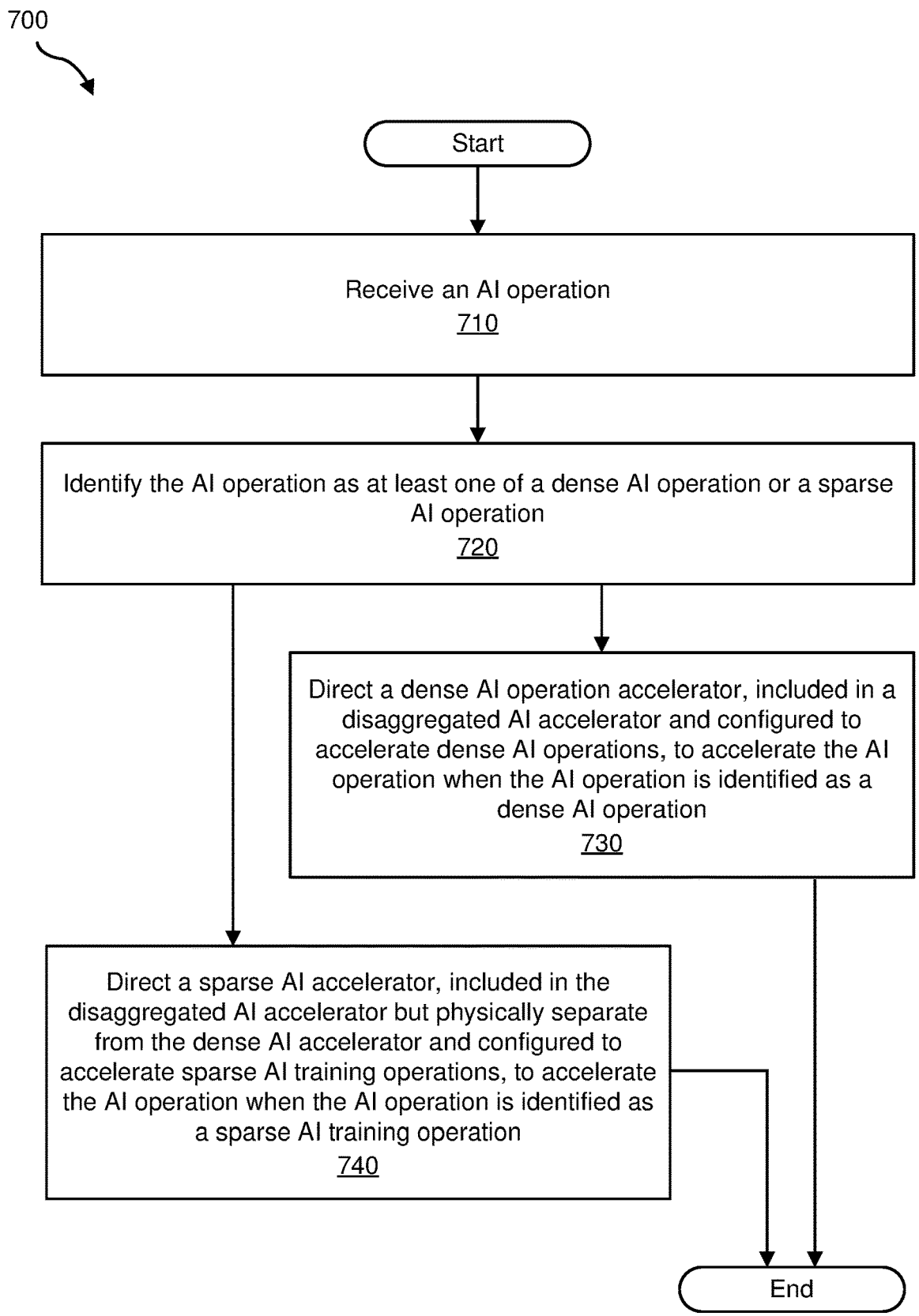
FIG. 7 is a flow diagram of an example method for disaggregated acceleration of artificial intelligence operations as described herein.

FIG. 7 is a flow diagram of an example computer-implemented method 700 for disaggregated acceleration of artificial intelligence operations. The steps shown in FIG. 7 may be performed by any suitable computer-executable code and/or computing system, including scheduler 108 in FIG. 1, example scheduler system 600 in FIG. 6, and/or variations or combinations of one or more of the same. In one example, each of the steps shown in FIG. 7 may represent an algorithm whose structure includes and/or is represented by multiple sub-steps, examples of which will be provided in greater detail below.

As illustrated in FIG. 7, at step 710, one or more of the systems described herein may receive an AI operation. For example, receiving module 604 may, as part of a scheduler device (e.g., scheduler 108, example scheduler system 600, etc.), cause the scheduler device to receive at least one of AI operations 642 stored and/or maintained by data store 640. Receiving module 604 may receive the AI model training operation in any of the ways described herein such as via any suitable data connection that may couple receiving module 604 to data store 640.

At step 720, one or more of the systems described herein may identify the AI operation as at least one of a dense AI operation or a sparse AI operation. For example, identifying module 606 may, as part of a scheduler device (e.g., scheduler 108, example scheduler system 600, etc.), cause the scheduler device to identify the received AI operation as a dense AI operation or a sparse AI operation.

Identifying module 606 may identify AI operation in a variety of contexts. For example, identifying module 606 may identify the AI operation by determining that the AI operation is included in a predefined set of dense and/or sparse AI operations. By way of illustration, identifying module 606 may identify an AI operation by determining that the AI operation is an AI model training parameter specifying a matrix multiplication operation as applied to a set of AI model training data. As mentioned above, this type of AI training operation may be classified as a dense AI training operation. Hence, identifying module 606 may identify the AI model training parameter (and any associated AI model training data) as a dense AI training operation.

As an additional example, identifying module 606 may identify an additional AI model training operation as an AI model training parameter specifying a ReLU operation associated with an additional set of AI model training data. As described above, this type of operation may be classified as a sparse AI training operation. Hence, identifying module 606 may identify the AI model training parameter (and any associated AI model training data), as a sparse AI training operation.

In some embodiments, identifying module 606 may identify AI operation data (and any associated AI models and/or parameters) as dense AI operations or sparse AI operations based on a density of non-zero data elements included in the AI operation data. For example, receiving module 604 may receive an AI operation, and identifying module 606 may identify the AI operation as AI model training data (e.g., AI model training data 202). Identifying module 606 may analyze the AI model training data and may determine that the AI model training data has a density of non-zero data elements greater than a threshold density. Hence, identifying module 606 may identify the AI model training data (and any associated AI model training parameters) as dense AI training operations.

Conversely, identifying module 606 may analyze the AI model training data and may determine that the AI model training data has a density of non-zero elements less than or equal to the threshold density. Hence, identifying module 606 may identify the AI model training data (and any associated AI model training parameters) as sparse AI training operations.

In accordance with principles disclosed herein, embodiments of the systems and methods described herein may similarly accelerate other AI operations such as inference operations. For example, receiving module 604 may receive an AI operation by receiving a feature input for a trained AI model (e.g., one or more of feature inputs 302) and/or an AI model trained to make inferences regarding feature inputs (e.g., trained AI model 304). Identifying module 606 may analyze the feature input and/or the trained AI model and may determine that the trained AI model may generate an inference regarding the feature input more efficiently using a dense AI accelerator versus a sparse AI accelerator or vice versa. Hence, identifying module 606 may identify the inference to be made regarding the feature input via the trained AI model as a dense AI operation and/or a sparse AI operation, and directing module 608 may direct dense AI accelerator 652 and/or sparse AI accelerator 654 to accelerate the inference operation.

By dynamically identifying AI operations (e.g., AI model training data and/or AI model training parameters) as dense or sparse AI model training operations, the systems and methods described herein may dynamically and effectively direct dense AI training operations towards purpose-built dense AI accelerators and sparse AI training operations toward purpose-built sparse AI training accelerators.

Hence, returning to FIG. 7, at step 730, one or more of the systems described herein may direct a dense AI accelerator, included in a disaggregated AI operation accelerator and configured to accelerate dense AI operations, to accelerate the AI operation when it is identified as a dense AI training operation. For example, directing module 608 may, as part of a scheduler device (e.g., scheduler 108, example scheduler system 600, etc.), cause the scheduler device to direct dense AI accelerator 652, included in disaggregated AI operation accelerator 650, to accelerate the identified AI operation.

Directing module 608 may direct dense AI accelerator 652 to accelerate the AI operation in any suitable way. For example, as described above, a dense AI accelerator (e.g., dense AI accelerator 104, dense AI accelerator 652, etc.) may include a vector unit, a wide matrix unit and/or a tensor unit. The dense AI accelerator may also include a memory cache local to the dense AI accelerator and associated with the vector unit, the wide matrix unit, and/or the tensor unit. When identifying module 606 identifies an AI operation as a dense AI operation, directing module 608 may direct dense AI accelerator 652 to accelerate the dense AI training operation by (1) loading a set of AI data (e.g., AI model training data, AI model training parameters, feature inputs, etc., a trained AI model, etc.) into the memory cache local to the dense AI accelerator, and (2) directing the dense AI accelerator to execute the dense AI operation (e.g., via the wide vector unit and/or the tensor unit) using the set of AI data loaded into the memory cache local to the dense AI accelerator.

Returning to FIG. 7, at step 740, one or more of the systems described herein may direct a sparse AI accelerator, included in a disaggregated AI operation accelerator and configured to accelerate sparse AI operations, to accelerate the AI operation when it is identified as a sparse AI operation. For example, directing module 608 may, as part of a scheduler device (e.g., scheduler 108, example scheduler system 600, etc.) cause the scheduler device to direct sparse AI accelerator 654, included in disaggregated AI operation accelerator 650, to accelerate the identified AI operation.

Directing module 608 may direct sparse AI accelerator 654 to accelerate the AI training operation in any suitable way. For example, as described above, sparse AI accelerator 654 may include a general-purpose compute unit and a high-bandwidth memory local to the sparse AI accelerator. When identifying module 606 identifies the AI operation as a sparse AI operation, directing module 608 may direct sparse AI accelerator 654 to accelerate the sparse AI training operation by (1) loading a set of AI data (e.g., AI model training data, AI model training parameters, feature inputs, etc., a trained AI model, etc.) into the high-bandwidth memory local to the sparse AI accelerator, and (2) directing the sparse AI accelerator to execute the sparse AI operation using the set of AI data loaded into the high-bandwidth memory local to the sparse AI accelerator.

As discussed throughout the instant disclosure, the disclosed systems and methods may provide one or more advantages over traditional options for accelerating AI operations. For example, by disaggregating AI operations into independent sparse and dense portions, systems and methods described herein may effectively utilize two different accelerator architectures, each targeting a specific category of functions (e.g., dense functions versus sparse functions), thus resulting in a more efficient AI training solution.

In some examples, the dense accelerators described herein may include wide matrix and tensor units and an associated cache. This may simplify accelerator design tremendously and may also provide an appropriately sized solution for specific dense training applications. The sparse accelerators described herein may also be constructed from high-bandwidth memory or other forms of memory. In addition to the memory, sparse accelerators may also include wide vector units that may enable element wise operations like ReLU, sigmoid, hyperbolic tanh, and similar operations. The sparse accelerators described herein may be primarily focused on embedding and memory operations of AI model training and/or inference.

This may effectively disaggregate an AI training and/or inference problem into two portions (e.g., dense and/or sparse), thus enabling the development of a design that may include hardware specifically built to efficiently execute each training function. In this new approach, the dense and sparse portions may scale independently of each other as may be beneficial for a particular AI operation and/or model. For example, as illustrated in FIG. 5 above, an example disaggregated AI operation accelerator may include more or fewer dense resources and/or more or fewer sparse resources. The amounts of each resource may be based on the needs for efficient, beneficial, and/or appropriate training of and/or inferences via a particular AI model. This flexibility may further enable efficient scaling of AI infrastructures, particularly AI training and/or inference infrastructures dealing with large amounts of AI training and/or inference requests and/or extensive available AI training and/or inference data.

EXAMPLE EMBODIMENTS

Example 1: A system comprising (1) a disaggregated artificial intelligence (AI) operation accelerator comprising: (A) a dense AI operation accelerator configured to accelerate dense AI operations, (B) a sparse AI operation accelerator, physically separate from the dense AI operation accelerator, configured to accelerate sparse AI operations, and (3) a scheduler comprising: (A) a receiving module that receives an AI operation, (B) an identifying module that identifies the AI operation as at least one of a dense AI operation or a sparse AI operation, and (C) a directing module that directs: (i) the dense AI operation accelerator to accelerate the AI operation when the identifying module identifies it as a dense AI operation, and (ii) the sparse AI operation accelerator to accelerate the AI operation when the identifying module identifies it as a sparse AI operation, and (D) a physical processor that executes the receiving module, the identifying module, and the directing module.

Example 2: The system of example 1, wherein (1) the system further comprises an additional dense AI operation accelerator, and (2) when the identifying module identifies the AI operation as a dense AI operation, the directing module directs at least one of the dense AI operation accelerator or the additional dense AI operation accelerator to accelerate the AI operation.

Example 3: The system of any of examples 1-2, wherein (1) the system further comprises an additional sparse AI operation accelerator, and (2) when the identifying module identifies the AI operation as a sparse AI operation, the directing module directs at least one of the sparse AI operation accelerator or the additional sparse AI operation accelerator to accelerate the sparse AI operation.

Example 4: The system of any of examples 1-3, the disaggregated AI operation accelerator further comprising a high-bandwidth bus that communicatively couples the dense AI operation accelerator and the sparse AI operation accelerator.

Example 5: The system of any of examples 1-4, the dense AI operation accelerator comprising (1) at least one of a wide matrix unit or a tensor unit, and (2) a memory cache local to the dense AI operation accelerator and associated with at least one of the wide matrix unit or the tensor unit.

Example 6: The system of example 5, wherein (1) the identifying module identifies the AI operation as a dense AI operation, and (2) the directing module directs the dense AI operation accelerator to accelerate the dense AI operation by (A) loading a set of AI operation data into the memory cache local to the dense AI operation accelerator, and (B) directing the dense AI operation accelerator to execute the dense AI operation using the set of AI operation data loaded into the memory cache local to the dense AI operation accelerator.

Example 7: The system of any of examples 1-6, the sparse AI operation accelerator comprising (1) a general-purpose compute unit, and (2) a high-bandwidth memory local to the sparse AI operation accelerator.

Example 8: The system of example 7, wherein (1) the identifying module identifies the AI operation as a sparse AI operation, and (2) the directing module directs the sparse AI operation accelerator to accelerate the sparse AI operation by (A) loading a set of AI operation data into the high-bandwidth memory local to the sparse AI operation accelerator, and (B) directing the sparse AI operation accelerator to execute the sparse AI operation using the set of AI operation data loaded into the high-bandwidth memory local to the sparse AI operation accelerator.

Example 9: The system of any of examples 7-8, the sparse AI operation accelerator further comprising at least one wide vector unit.

Example 10: The system of example 1-9, wherein the sparse AI operation accelerator is configured to execute an element-wise AI operation.

Example 11: The system of example 10, wherein the element-wise AI operation comprises at least one of (1) a rectified linear unit (ReLU) operation, (2) a sigmoid operation, or (3) a hyperbolic tangent (tanh) function.

Example 12: The system of any of examples 1-11, wherein the AI operation comprises at least one of (1) an AI training operation, or (2) an AI inference operation.

Example 13: A computer-implemented method comprising (1) receiving, by a scheduler included in a disaggregated artificial intelligence (AI) operation accelerator, an AI operation, (2) identifying, by the scheduler included in the disaggregated AI operation accelerator, the AI operation as at least one of a dense AI operation or a sparse AI operation, and (3) directing, by the scheduler included in the disaggregated AI operation accelerator (A) a dense AI operation accelerator, included in the disaggregated AI operation accelerator and configured to accelerate dense AI operations, to accelerate the AI operation when the scheduler identifies the AI operation as a dense AI operation, and (B) a sparse AI operation accelerator, included in the disaggregated AI operation accelerator but physically separate from the dense AI operation accelerator and configured to accelerate sparse AI operations, to accelerate the AI operation when the scheduler identifies the AI operation as a sparse AI operation.

Example 14: The method of example 13, wherein (1) identifying the AI operation comprises identifying the AI operation as a dense AI operation, and (2) directing the dense AI operation accelerator to accelerate the AI operation comprises (A) loading a set of AI operation data into a memory cache local to the dense AI operation accelerator, the memory cache associated with at least one of a wide matrix unit included in the dense AI operation accelerator or a tensor unit included in the dense AI operation accelerator, and (B) directing the dense AI operation accelerator to execute the AI operation using the set of AI operation data loaded into the memory cache local to the dense AI operation accelerator.

Example 15: The method of any of examples 13-14, wherein (1) identifying the AI operation comprises identifying the AI operation as a sparse AI operation, (2) directing the sparse AI operation accelerator to accelerate the AI operation comprises (A) loading a set of AI operation data into a high-bandwidth memory local to the sparse AI operation accelerator, and (B) directing the sparse AI operation accelerator to execute the AI operation using the set of AI operation data loaded into the high-bandwidth memory local to the sparse AI operation accelerator.

Example 16: The method of any of examples 13-15, wherein (1) the AI operation comprises a set of AI operation data, (2) identifying the AI operation comprises (A) determining whether the set of AI operation data meets a threshold density value, (B) when the set of AI operation data meets the threshold density value, designating the AI operation as a dense AI operation, and (C) when the set of AI operation data does not meet the threshold density value, designating the AI operation as a sparse AI operation.

Example 17: The method of any of examples 13-16, wherein (1) the AI operation comprises a set of AI operation parameters, (2) identifying the AI operation comprises (A) determining whether the set of AI operation parameters correspond to a dense AI operation, (B) when the set of AI operation parameters correspond to a dense AI operation, designating the AI operation as a dense AI operation, and (C) when the set of AI operation parameters correspond to a sparse AI operation, designating the AI operation as a sparse AI operation.

Example 18: A non-transitory computer-readable medium comprising computer-readable instructions that, when executed by at least one processor of a scheduler included in a disaggregated artificial intelligence (AI) operation accelerator, cause the scheduler to (1) receive an AI operation, (2) identify the AI operation as at least one of a dense AI operation or a sparse AI operation, and (3) direct (A) a dense AI operation accelerator, included in the disaggregated AI operation accelerator and configured to accelerate dense AI operations, to accelerate the AI operation when it is identified as a dense AI operation, and (B) a sparse AI operation accelerator, included in the disaggregated AI operation accelerator but physically separate from the dense AI operation accelerator and configured to accelerate sparse AI operations, to accelerate the AI operation when it is identified as a sparse AI operation.

Example 19: The non-transitory computer-readable medium of example 18, further comprising computer-readable instructions that, when executed by the at least one processor of the scheduler, cause the scheduler to (1) identify the AI operation as a dense AI operation, and (2) direct the dense AI operation accelerator to accelerate the dense AI operation by (A) loading a set of AI operation data into a memory cache local to the dense AI operation accelerator, the memory cache associated with at least one of a wide matrix unit included in the dense AI operation accelerator or a tensor unit included in the dense AI operation accelerator, and (B) directing the dense AI operation accelerator to execute the dense AI operation using the set of AI operation data loaded into the memory cache local to the dense AI operation accelerator.

Example 20: The non-transitory computer-readable medium of any of examples 18-19, further comprising computer-readable instructions that, when executed by the at least one processor of the scheduler, cause the scheduler to (1) identify the AI operation as a sparse AI operation, (2) direct the sparse AI operation accelerator to accelerate the sparse AI operation by (A) loading a set of AI operation data into a high-bandwidth memory local to the sparse AI operation accelerator, and (B) directing the sparse AI operation accelerator to execute the sparse AI operation using the set of AI operation data loaded into the high-bandwidth memory local to the sparse AI operation accelerator.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive AI training data to be transformed, transform the AI training data, output a result of the transformation to use e.g., make inferences regarding input data using) a trained AI model, use the result of the transformation to make a prediction using a trained AI model, and store the result of the transformation to revise and/or refine a training of a trained AI model. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a disaggregated artificial intelligence (AI) operation accelerator comprising:
      a dense AI operation accelerator configured to accelerate dense AI operations;
      a sparse AI operation accelerator, physically separate from the dense AI operation accelerator, configured to accelerate sparse AI operations;
      a high-bandwidth bus that directly communicatively couples the dense AI operation accelerator and the sparse AI operation accelerator; and
   a scheduler comprising:
      a receiving module that receives an AI operation, the AI operation comprising a task associated with an AI model;
      an identifying module that identifies the AI operation as at least one of a dense AI operation or a sparse AI operation; and
      a directing module that dynamically disaggregates AI operations into sparse operations and dense operations by directing:
         the dense AI operation accelerator to accelerate the AI operation when the identifying module identifies it as a dense AI operation; and
         the sparse AI operation accelerator to accelerate the AI operation when the identifying module identifies it as a sparse AI operation; and
      a physical processor that executes the receiving module, the identifying module, and the directing module.

2. The system of claim 1, wherein:
   the system further comprises an additional dense AI operation accelerator; and
   when the identifying module identifies the AI operation as a dense AI operation, the directing module directs at least one of the dense AI operation accelerator or the additional dense AI operation accelerator to accelerate the AI operation.

3. The system of claim 1, wherein:
   the system further comprises an additional sparse AI operation accelerator; and
   when the identifying module identifies the AI operation as a sparse AI operation, the directing module directs at least one of the sparse AI operation accelerator or the additional sparse AI operation accelerator to accelerate the sparse AI operation.

4. The system of claim 1, the dense AI operation accelerator comprising:
   at least one of a wide matrix unit or a tensor unit; and
   a memory cache local to the dense AI operation accelerator and associated with at least one of the wide matrix unit or the tensor unit.

5. The system of claim 4, wherein:
   the identifying module identifies the AI operation as a dense AI operation; and
   the directing module directs the dense AI operation accelerator to accelerate the dense AI operation by:
      loading a set of AI operation data into the memory cache local to the dense AI operation accelerator; and
      directing the dense AI operation accelerator to execute the dense AI operation using the set of AI operation data loaded into the memory cache local to the dense AI operation accelerator.

6. The system of claim 1, the sparse AI operation accelerator comprising:
   a general-purpose compute unit; and
   a high-bandwidth memory local to the sparse AI operation accelerator.

7. The system of claim 6, wherein:
   the identifying module identifies the AI operation as a sparse AI operation; and
   the directing module directs the sparse AI operation accelerator to accelerate the sparse AI operation by:
      loading a set of AI operation data into the high-bandwidth memory local to the sparse AI operation accelerator; and
      directing the sparse AI operation accelerator to execute the sparse AI operation using the set of AI operation data loaded into the high-bandwidth memory local to the sparse AI operation accelerator.

8. The system of claim 6, the sparse AI operation accelerator further comprising at least one wide vector unit.

9. The system of claim 1, wherein the sparse AI operation accelerator is configured to execute an element-wise AI operation.

10. The system of claim 9, wherein the element-wise AI operation comprises at least one of:
    a rectified linear unit (ReLU) operation;
    a sigmoid operation; or
    a hyperbolic tangent (tanh) function.

11. The system of claim 1, wherein the AI operation comprises at least one of:
    an AI training operation; or
    an AI inference operation.

12. A computer-implemented method comprising:
receiving, by a scheduler included in a disaggregated artificial intelligence (AI) operation accelerator, an AI operation, the AI operation comprising a task associated with an AI model;
identifying, by the scheduler included in the disaggregated AI operation accelerator, the AI operation as at least one of a dense AI operation or a sparse AI operation; and
dynamically disaggregating, by the scheduler included in the disaggregated AI operation accelerator, AI operations into sparse operations and dense operations by directing:
   a dense AI operation accelerator, included in the disaggregated AI operation accelerator and configured to accelerate dense AI operations, to accelerate the AI operation when the scheduler identifies the AI operation as a dense AI operation; and
   a sparse AI operation accelerator, included in the disaggregated AI operation accelerator but physically separate from the dense AI operation accelerator and configured to accelerate sparse AI operations, to accelerate the AI operation when the scheduler identifies the AI operation as a sparse AI operation;
wherein a high-bandwidth bus directly communicatively couples the dense AI operation accelerator and the sparse AI operation accelerator.

13. The method of claim 12, wherein:
identifying the AI operation comprises identifying the AI operation as a dense AI operation; and
directing the dense AI operation accelerator to accelerate the AI operation comprises:
loading a set of AI operation data into a memory cache local to the dense AI operation accelerator, the memory cache associated with at least one of a wide matrix unit included in the dense AI operation accelerator or a tensor unit included in the dense AI operation accelerator; and
directing the dense AI operation accelerator to execute the AI operation using the set of AI operation data loaded into the memory cache local to the dense AI operation accelerator.

14. The method of claim 12, wherein:
identifying the AI operation comprises identifying the AI operation as a sparse AI operation;
directing the sparse AI operation accelerator to accelerate the AI operation comprises:
loading a set of AI operation data into a high-bandwidth memory local to the sparse AI operation accelerator; and
directing the sparse AI operation accelerator to execute the AI operation using the set of AI operation data loaded into the high-bandwidth memory local to the sparse AI operation accelerator.

15. The method of claim 12, wherein:
the AI operation comprises a set of AI operation data;
identifying the AI operation comprises:
   determining whether the set of AI operation data meets a threshold density value;
   when the set of AI operation data meets the threshold density value, designating the AI operation as a dense AI operation; and
   when the set of AI operation data does not meet the threshold density value, designating the AI operation as a sparse AI operation.

16. The method of claim 12, wherein:
the AI operation comprises a set of AI operation parameters;
identifying the AI operation comprises:
   determining whether the set of AI operation parameters correspond to a dense AI operation;
   when the set of AI operation parameters correspond to a dense AI operation, designating the AI operation as a dense AI operation; and
   when the set of AI operation parameters correspond to a sparse AI operation, designating the AI operation as a sparse AI operation.

17. The method of claim 12, wherein the AI operation comprises at least one of:
an AI training operation; or
an AI inference operation.

18. A non-transitory computer-readable medium comprising computer-readable instructions that, when executed by at least one processor of a scheduler included in a disaggregated artificial intelligence (AI) operation accelerator, cause the scheduler to:
receive an AI operation, the AI operation comprising a task associated with an AI model;
identify the AI operation as at least one of a dense AI operation or a sparse AI operation; and
dynamically disaggregate AI operations into sparse operations and dense operations by directing:
   a dense AI operation accelerator, included in the disaggregated AI operation accelerator and configured to accelerate dense AI operations, to accelerate the AI operation when it is identified as a dense AI operation; and
   a sparse AI operation accelerator, included in the disaggregated AI operation accelerator but physically separate from the dense AI operation accelerator and configured to accelerate sparse AI operations, to accelerate the AI operation when it is identified as a sparse AI operation;
wherein a high-bandwidth bus directly communicatively couples the dense AI operation accelerator and the sparse AI operation accelerator.

19. The non-transitory computer-readable medium of claim 18 further comprising computer-readable instructions that, when executed by the at least one processor of the scheduler, cause the scheduler to:
identify the AI operation as a dense AI operation; and
direct the dense AI operation accelerator to accelerate the dense AI operation by:
   loading a set of AI operation data into a memory cache local to the dense AI operation accelerator, the memory cache associated with at least one of a wide matrix unit included in the dense AI operation accelerator or a tensor unit included in the dense AI operation accelerator; and
   directing the dense AI operation accelerator to execute the dense AI operation using the set of AI operation data loaded into the memory cache local to the dense AI operation accelerator.

20. The non-transitory computer-readable medium of claim 18 further comprising computer-readable instructions that, when executed by the at least one processor of the scheduler, cause the scheduler to:
  identify the AI operation as a sparse AI operation;
  direct the sparse AI operation accelerator to accelerate the sparse AI operation by:
    loading a set of AI operation data into a high-bandwidth memory local to the sparse AI operation accelerator; and
    directing the sparse AI operation accelerator to execute the sparse AI operation using the set of AI operation data loaded into the high-bandwidth memory local to the sparse AI operation accelerator.

* * * * *